US006812981B2

United States Patent
Yoshino

(10) Patent No.: US 6,812,981 B2
(45) Date of Patent: Nov. 2, 2004

(54) LIQUID CRYSTAL DISPLAY DEVICE AND MOBILE PHONE

(75) Inventor: Yuichi Yoshino, Ohara-machi (JP)

(73) Assignees: Hitachi, Ltd., Tokyo (JP); Hitachi Device Engineering Co., Ltd., Mobara (JP)

(*) Notice: Subject to any disclaimer, the term of this patent is extended or adjusted under 35 U.S.C. 154(b) by 268 days.

(21) Appl. No.: 09/875,883

(22) Filed: Jun. 8, 2001

(65) Prior Publication Data

US 2002/0021391 A1 Feb. 21, 2002

(30) Foreign Application Priority Data

Aug. 10, 2000 (JP) ........................................ 2000-242977

(51) Int. Cl.[7] ........................................... G02F 1/1335
(52) U.S. Cl. ........................ 349/114; 349/76; 349/109; 349/110; 349/113
(58) Field of Search ........................... 349/76, 109, 110, 349/113, 114, 179

(56) References Cited

U.S. PATENT DOCUMENTS

| 4,637,687 A | * | 1/1987 | Haim et al. ................... 349/81 |
| 5,881,299 A | * | 3/1999 | Nomura et al. ............. 713/324 |
| 6,181,399 B1 | * | 1/2001 | Odoi et al. .................. 349/113 |
| 6,262,842 B1 | * | 7/2001 | Ouderkirk et al. .......... 359/487 |
| 6,317,181 B1 | * | 11/2001 | Hoshino ....................... 349/98 |
| 6,522,347 B1 | * | 2/2003 | Tsuji et al. .................. 345/848 |

FOREIGN PATENT DOCUMENTS

| JP | 06230361 A | * 8/1994 | ......... G02F/1/1335 |
| JP | 2001-75503 | 3/2001 | |

* cited by examiner

Primary Examiner—Tom Thomas
Assistant Examiner—Matthew E. Warren
(74) Attorney, Agent, or Firm—Antonelli, Terry, Stout & Kraus, LLP

(57) ABSTRACT

The present invention is provided for obtaining a liquid crystal display device and a mobile phone which exhibit the low power consumption and do not damage the display quality. To this end, a display part of the liquid crystal display device is divided into two regions, wherein one region performs a display in a semi-transmission type or in a reflection type and the other region performs a display in a transmission type. Further, the display is performed in a state that the liquid crystal display device is incorporated into the mobile phone.

17 Claims, 2 Drawing Sheets

LIQUID CRYSTAL DISPLAY DEVICE AND MOBILE PHONE

BACKGROUND OF THE INVENTION (1) Field of the Invention

The present invention relates to a liquid crystal display device and a mobile phone, for example, a liquid crystal display device which is incorporated into a mobile phone and a mobile phone which incorporates a liquid crystal display device thereinto.

(2) Description of the Related Art

A mobile phone includes a display part which is constituted of a liquid crystal display device and this display part displays pixel data having relatively large data quantity as well as time, a received incoming signal state, a remaining battery quantity and the like.

Then, the liquid crystal display device includes an envelope which is made of a pair of substrates being arranged in an opposed manner while sandwiching a liquid crystal therebetween and a display region made of a large number of pixels which are distributed in an expanding direction of the liquid crystal. Each pixel is designed to control the optical transmissibility of the liquid crystal in response to an electric field generated between a pair of electrodes incorporated into each pixel.

In this manner, the liquid crystal display device per se does not emit light and hence, to make the liquid crystal display device perform the display, a backlight which makes light pass through the liquid crystal of each pixel, a reflector which makes an external light from sun or the like pass through the liquid crystal of each pixel and thereafter reflect therefrom or the like is necessary.

However, in such a mobile phone, the provision of the backlight which is made to always emit light is not favorable from the viewpoint of achieving the low power consumption while the display of the liquid crystal display device using only the reflector is not favorable from the viewpoint of seeking for high quality images.

SUMMARY OF THE INVENTION

The invention has been made in view of the above drawbacks and it is an object of the present invention to provide a liquid crystal display device and a mobile phone which exhibit the low power consumption and do not deteriorate the display quality.

The summary of a typical example of inventions disclosed in the application is explained hereinafter.

That is, according to the liquid crystal display device of the invention, for example, in a liquid crystal display device which is incorporated into a mobile phone, a display part is divided into at least a region which performs a display of a small information quantity and a region which performs a display of a large information quantity, wherein the region which performs the display of a small information quantity adopts a semi-transmission type or a reflection type for performing the display and the region which performs the display of a large information quantity adopts a transmission type for performing the display.

In the liquid crystal display device having such a constitution, with respect to the display of a small information quantity, it becomes particularly unnecessary to turn on a backlight and hence, the low power consumption can be achieved correspondingly.

In the case of a mobile phone, time, a received incoming signal state, a remaining battery quantity and the like are displayed until the reception of an incoming call. By displaying these portions in a semi-transmission type or a reflection type, the power consumption can be largely reduced. (In this case, since such a display aims at the recognition of time, the received incoming signal state, the remaining battery quantity and the like, it is not particularly inconvenient even when the image quality is deteriorated to some extent.)

Further, by displaying the transmitted image data in a transmission type after receiving the incoming call, although the backlight consumes the electric power, the consumption time is short and it is possible to visualize the image data as a high-quality image.

In this manner, according to the invention, a liquid crystal display device and a mobile phone which exhibit a relatively low power consumption and do not damage the display quality can be obtained.

DESCRIPTION OF THE PREFERRED EMBODIMENTS

An embodiment of a liquid crystal display device according to the present invention is explained hereinafter in conjunction with attached drawings.

Figure 2:
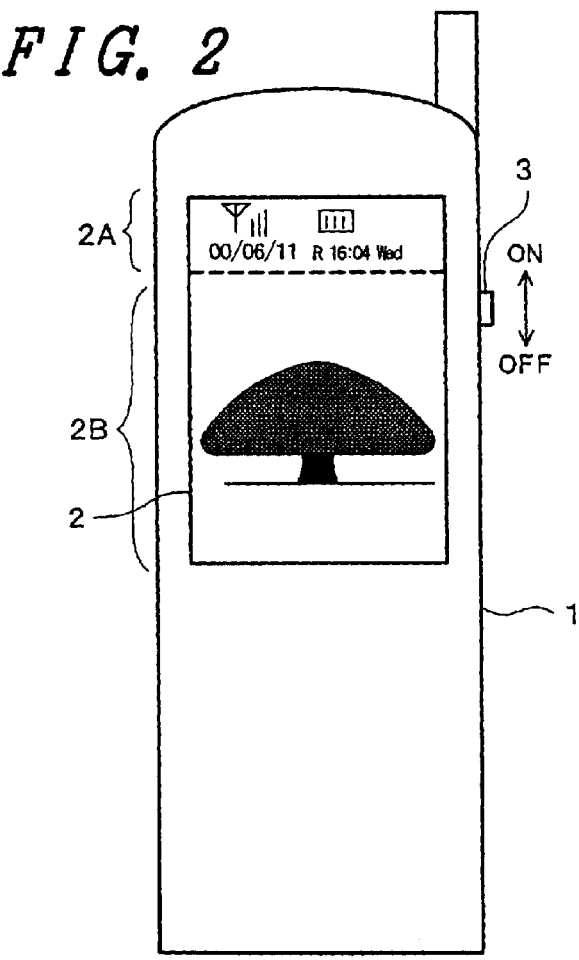
FIG. 2 is an outer appearance view showing an embodiment of a mobile phone into which the liquid crystal display device of the invention is incorporated.

FIG. 2 is an entire structural view showing an embodiment of a mobile phone to which a liquid crystal display device of the present invention is applicable.

A display part 2 which is constituted of a liquid crystal display device is provided to a front surface of a housing 1 of a mobile phone and this display part 2 is divided into a first display part 2A which constitutes an upper portion thereof and has a relatively small area and a second display part 2B which constitutes a lower portion thereof and has a relatively large area.

Time, a received incoming call state, a remaining battery quantity and the like are displayed on the first display part 2A using numerals, symbols and the like and pixel data for transmission and reception are displayed on the second display part 2B.

Further, although it will be explained later, the first display part 2A performs displaying as a liquid crystal display of a semi-transmission type and the second display part 2B performs displaying as a liquid crystal display of a transmission type.

Then, a backlight (not shown in the drawing) is disposed at a back surface of the liquid crystal display device which constitutes the display part 2 and, with the use of a changeover switch 3, this backlight is turned off when the first display part 2A is to be displayed and is turned on when the second display part 2B is to be displayed.

In this case, it may be constituted such that the changeover switch 3 is eliminated and instead the mobile phone per se judges whether the display is the first display part 2A or the second display part 2B and automatically turns on or off the backlight based on the judgement.

Figure 3:
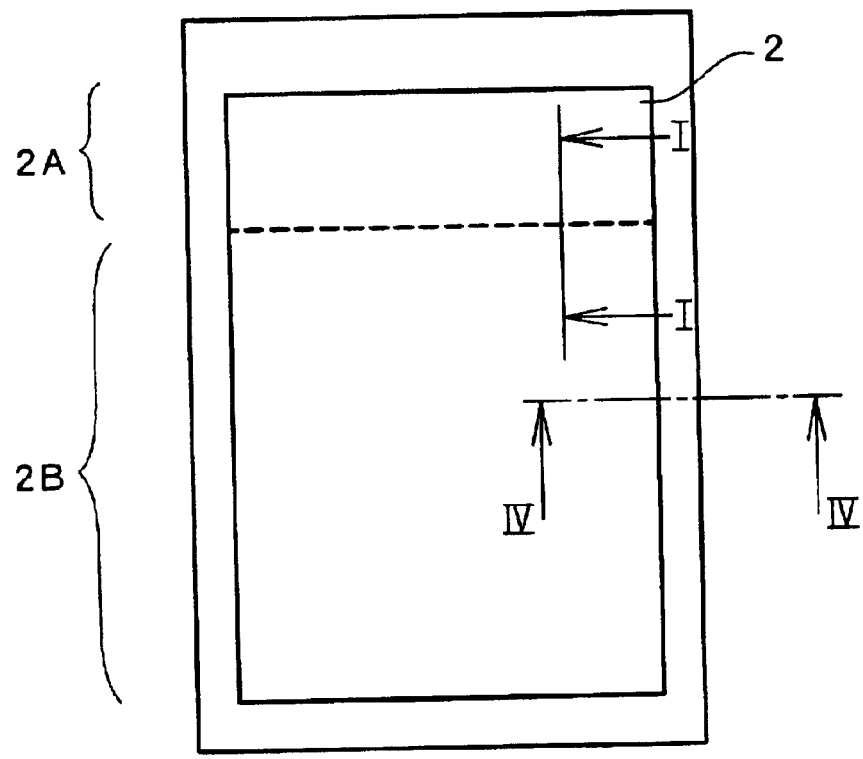
FIG. 3 is a plan view of an example of a liquid crystal display device of the invention which is incorporated into a mobile phone.

FIG. 3 is a plan view showing one embodiment of the liquid crystal display device which is constituted as the above-mentioned display part 2.

Here, this liquid crystal display device is, for example, called a TN (Twisted Nematic) type and includes a large number of pixel electrodes which are extended in the x direction and are arranged in parallel in the y direction on a liquid-crystal side surface of one of transparent substrates which are arranged in an opposed manner by way of a liquid crystal and a large number of scanning electrodes which are extended in the y direction and are arranged in parallel in the x direction on a liquid-crystal side surface of the other transparent substrate, wherein a pixel is constituted at each crossing portion between the pixel electrode and the scanning electrode.

Figure 1:
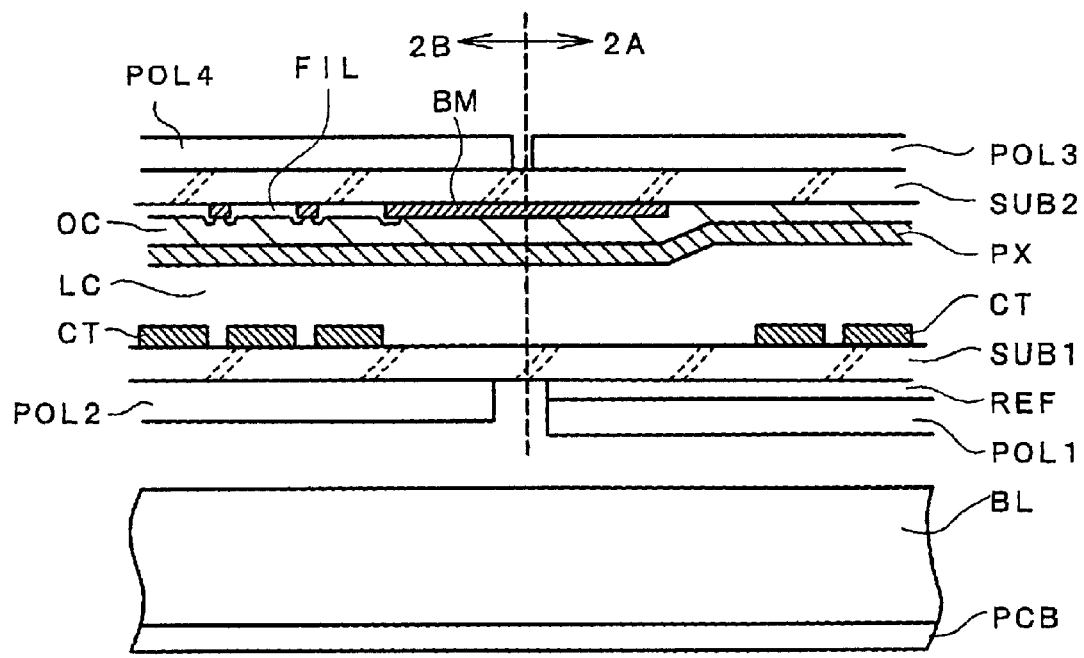
FIG. 1 is a cross-sectional view of an essential part showing one embodiment of a liquid crystal display device according to the invention and is also a cross-sectional view taken along a line I—I of FIG. 3.
Figure 4:
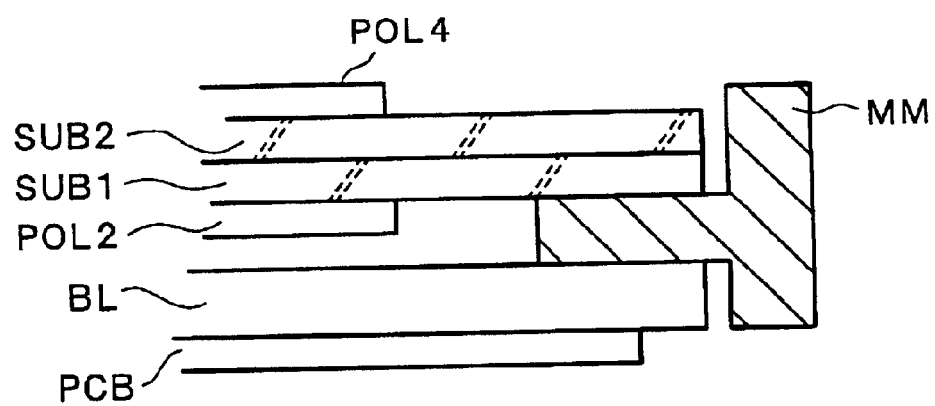
FIG. 4 is a cross-sectional view taken along a line IV—IV of FIG. 3.

A cross-sectional view taken along a line IV—IV in FIG. 3 is shown in FIG. 4 and a cross-sectional view taken along a line I—I in FIG. 3 is shown in FIG. 1.

First of all, in FIG. 4 and FIG. 1, there is provided a transparent substrate SUB1 which constitutes a lower substrate and counter electrodes CT which are extended in the direction from the front of a paper surface to the rear of a paper surface and are arranged in the direction perpendicular to the above-mentioned direction are formed on a liquid-crystal LC side surface of the transparent substrate SUB1.

These respective counter electrodes CT are formed of transparent electrodes which are made of ITO (Indium-Tin-Oxide) and the voltage which becomes the reference with respect to video signals (voltage) supplied to pixel electrodes PX which will be explained later is sequentially supplied to respective counter electrodes CT along the direction parallel to the CT electrodes.

In this case, with respect to each counter electrode CT, in the first display part 2A and the second display part 2B, although the distance between the counter electrode CT and the neighboring counter electrode CT is set substantially equal, the distance between the counter electrode CT which is disposed in the inside of the first display part 2A and is disposed close to the second display part 2B side and the counter electrode CT which is disposed in the inside of the second display part 2B and is disposed close to the first display part 2A side is formed in a slightly spaced-apart manner.

An orientation film (not shown in the drawing) which also covers respective counter electrodes CT is formed on a surface of the transparent substrate SUB1 on which respective counter electrodes CT are formed. This orientation film is a film which directly comes into contact with the liquid crystal LC and the initial orientation of the liquid crystal LC is determined by rubbings formed on the surface of the film.

On the other hand, on the liquid-crystal side surface of the transparent substrate SUB2 which is arranged such that transparent substrate SUB2 faces the transparent substrate SUB1 in an opposed manner by way of the liquid crystal LC, a black matrix BM is formed at the second display part 2B side.

This black matrix BM is configured such that apertures are formed at central portions excluding peripheries of respective pixels so as to define respective pixels. The black matrix BM is provided for enhancing the contrast of the display.

Then, this black matrix BM is formed such that the black matrix BM gets over a boundary between the first display part 2A and the second display part 2B and is slightly extended over the first display part 2A. The reason of this provision will be explained later.

Further, on an upper surface of the black matrix BM, color filters FIL are formed in the direction from the front of the paper surface to the rear of the paper surface such that the color filters FIL respectively cover the apertures of the black matrix BM which are arranged parallel to that direction.

The color filters FIL are made of red color (R), green color (G) and blue color (B) and they are repeatedly formed from the left side to the right side of the paper surface in this order.

In this manner, on the surface of the transparent substrate SUB2 on which the color filters FIL are formed, a flattened film OC which covers the color filters FIL is formed. This flattened film OC is, for example, made of a resin film formed by coating and is formed such that the irregularities derived from steps generated between the black matrix BM and the color filters FIL do not become apparent on the surface thereof.

Further, on the surface of the flattened film OC, pixel electrodes PX made of ITO, for example, which are extended from the left side to the right side of the paper surface and are arranged in parallel to the direction perpendicular to such an extension direction are formed.

These pixel electrodes PX are designed such that they generate an electric field between the pixel electrodes PX and the counter electrode CT (the liquid crystal LC being disposed between the pixel electrodes PX and the counter electrodes CT) and by supplying video signals (voltage) to the pixel electrodes PX, the liquid crystal LC is controlled to a light transmission quantity corresponding to the video signals.

Further, an orientation film (not shown in the drawing) which also covers respective pixel electrodes PX is formed on a surface of the transparent substrate SUB2 on which respective pixel electrodes PX are formed. This orientation film is a film which directly comes into contact with the liquid crystal LC and the initial orientation of the liquid crystal LC is determined by rubbings formed on the surface of the film.

Further, at a portion corresponding to the first display part 2A on a surface of the above-mentioned transparent substrate SUB1 which is disposed opposite to the liquid crystal LC, a reflection film REF is arranged and a monochromatic polarizer POL1 is formed on the reflection film REF.

Here, the reflection film REF is made of a film which allows the reflection and the transmission of light. With the provision of this film, the display of the first display part 2A can be recognized by an external light such as sun or the like even when the backlight BL is not provided (or, even when the backlight is turned off).

Further, at a portion corresponding to the second display part 2B on a surface of the above-mentioned transparent substrate SUB1 which is disposed opposite to the liquid crystal LC, a color polarizer POL2 is formed.

Different from the first display part 2A, this second display part 2B allows the recognition of the display thereof by making the light emitted from the backlight BL which is arranged on a back surface of the liquid crystal display device transmit therethrough.

Here, the polarizer POL1 formed on the first display part 2A side and the polarizer POL2 formed on the second display part 2B side have different constitutions and are made of different materials and hence, a slight gap is formed between them. In this case, the light emitted from the backlight BL is liable to be irradiated to the first display part 2A after passing this gap as a leakage of light.

Accordingly, as mentioned previously, the constitution in which the black matrix BM formed on the second display part 2B side is slightly extended over the first display part 2A side so as to shield the leakage of light with such an extended portion is adopted.

As mentioned previously, the backlight BL is turned on or off by the changeover switch 3 mounted on the housing 1 of the mobile phone. For example, when a user is waiting for an incoming signal, the backlight BL is turned off and the information displayed on the first display part 2A, that is, time, a received incoming signal state, a remaining battery quantity or the like can be recognized in a monochromatic display, while after receiving the incoming signal, image data transmitted from a counterpart or data having a relatively large information quantity can be observed in a color display having high quality.

Although the backlight BL is arranged such that the backlight BL is also extended over the portion of the first display part 2A, the present invention is not limited to such a constitution. For example, the backlight BL may be arranged only on the portion of the second display part 2B. In this case, it is needless to say that the reflection film REF can be replaced with a reflector made of metal or the like which has only a reflection function.

Further, on a surface of the transparent substrate SUB2 which is opposite to the liquid, a monochromatic polarizer POL3 is arranged at the first display part 2A side and a color polarizer POL4 is arranged at the second display part 2B side, and these polarizers POL3, POL4 are respectively coupled with the above-mentioned polarizers POL1 or POL2 so as to visualize the behavior of molecules of the liquid crystal LC.

Further, the above-mentioned transparent substrates SUB1 and SUB2 are adhered to each other while holding a gap therebetween which corresponds to a layer thickness of the liquid crystal LC. In FIG. 4, MM indicates a mold member and PCB indicates a printed circuit board.

In the above-mentioned embodiment, although the first display part 2A adopts the monochromatic display, it is needless to say that the present invention is not limited to such a constitution and the first display part 2A can adopt the color display in the same manner as the second display part 2B.

Further, it is needless to say that both of the first display part 2A and the second display part 2B may adopt the monochromatic display.

According to the liquid crystal display device and the mobile phone explained heretofore, it becomes possible to obtain the liquid crystal display device which exhibits the low power consumption and does not damage the display quality.

What is claimed is:

1. A liquid crystal display device characterized in that a display part is divided into two regions, wherein one region is displayed in a semi-transmission type or in a reflection type which enables display by reflecting light from an observation side of the liquid crystal display device and the other region is displayed in a transmission type.

2. A liquid crystal display device according to claim 1, wherein the liquid crystal display device is incorporated into a mobile phone.

3. A liquid crystal display device according to claim 1, further comprising a backlight.

4. A liquid crystal display device characterized in that a display part is divided into at least a region which performs a display of a small information quantity and a region which performs a display of a large information quantity, the region which performs a display of a small information quantity performs the display in a semi-transmission type or in a reflection type and the region which performs a display of a large information quantity performs the display in a transmission type.

5. A liquid crystal display device according to claim 4, wherein the region which performs the display of a large information quantity includes a black matrix and the black matrix is formed such that the black matrix gets over a boundary between the region which performs the display of a large information quantity and the region which performs the display of a small information quantity.

6. A liquid crystal display device according to claim 4, wherein the region which performs the display of a large information quantity adopts a color display and the region which performs the display of a small information quantity adopts a monochromatic display.

7. A liquid crystal display device according to claim 4, wherein the region which performs the display of a small information quantity displays at least one of time, a received incoming signal state and a remaining battery quantity and the region which performs the display of a large information quantity displays image data.

8. A liquid crystal display device according to claim 4, wherein the liquid crystal display device is incorporated into a mobile phone.

9. A liquid crystal display device according to claim 4, further comprising a backlight.

10. A mobile phone characterized in that the mobile phone includes a liquid crystal display device and a display part of the liquid crystal display device is divided into at least a region which performs a display of a small information quantity and a region which performs a display of a large information quantity, the region which performs a display of a small information quantity performs the display in a semi-transmission type or in a reflection type and the region which performs a display of a large information quantity performs the display in a transmission type.

11. A mobile phone according to claim 10, further comprising a backlight.

12. A liquid crystal display device characterized in that a display part is divided into a first display part and a second display part, the first display part being a region which enables display in a semi-transmission type or in a reflection type, and the second display part being a region which enables display in a transmission type, the second display part including a black matrix, the black matrix being formed so that the black matrix extends beyond a boundary between the first display part and the second display part.

13. A liquid crystal display device according to claim 12, wherein the first display part is a region which performs a display of a small information quantity, and the second display part is a region which performs a display of a large information quantity.

14. A liquid crystal display device according to claim 12, wherein the first display part is a region which performs monochromatic display, and the second display part is a region which performs color display.

15. A liquid crystal display device according to claim 12, wherein the first display part displays at least one of time, a received incoming signal state and a remaining battery quantity, and the second display part displays image data.

16. A liquid crystal display device according to claim 12, further comprising a backlight.

17. A mobile phone comprising a liquid crystal display device characterized in that a display part is divided into a first display part and a second display part, the first display part being a region which enables display in a semi-transmission type or in a reflection type, and the second display part being a region which enables display in a transmission type, the second display part including a black matrix, the black matrix being formed so that the black matrix extends beyond a boundary between the first display part and the second display part.

* * * * *